March 13, 1956 N. E. SPIESS, JR., ET AL 2,738,172
APPARATUS FOR TREATMENT OF PRODUCTS
WITH ULTRASONIC ENERGY
Filed Nov. 28, 1952 2 Sheets-Sheet 2
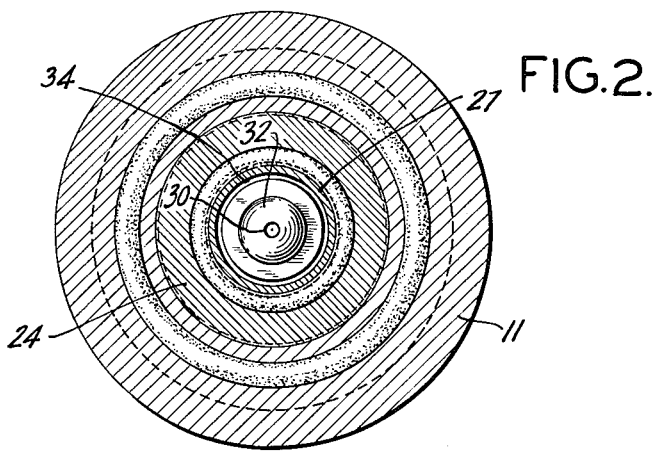
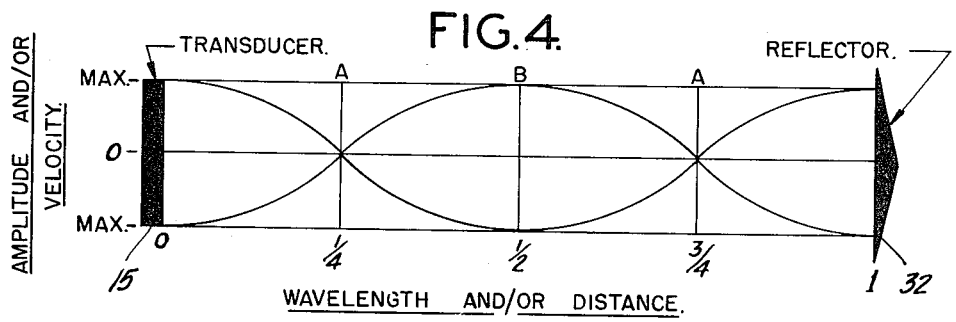
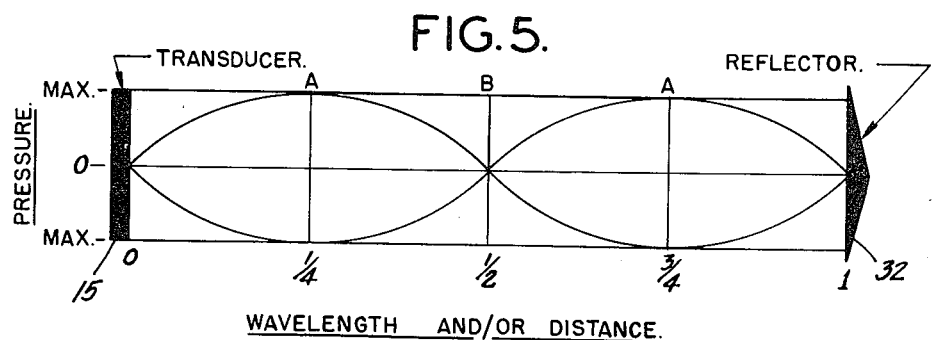
INVENTORS.
NEWTON E. SPIESS JR. &
HORACE L. JACKSON.
BY
*Campbell, Brumbaugh, Free & Graves*
their ATTORNEYS.

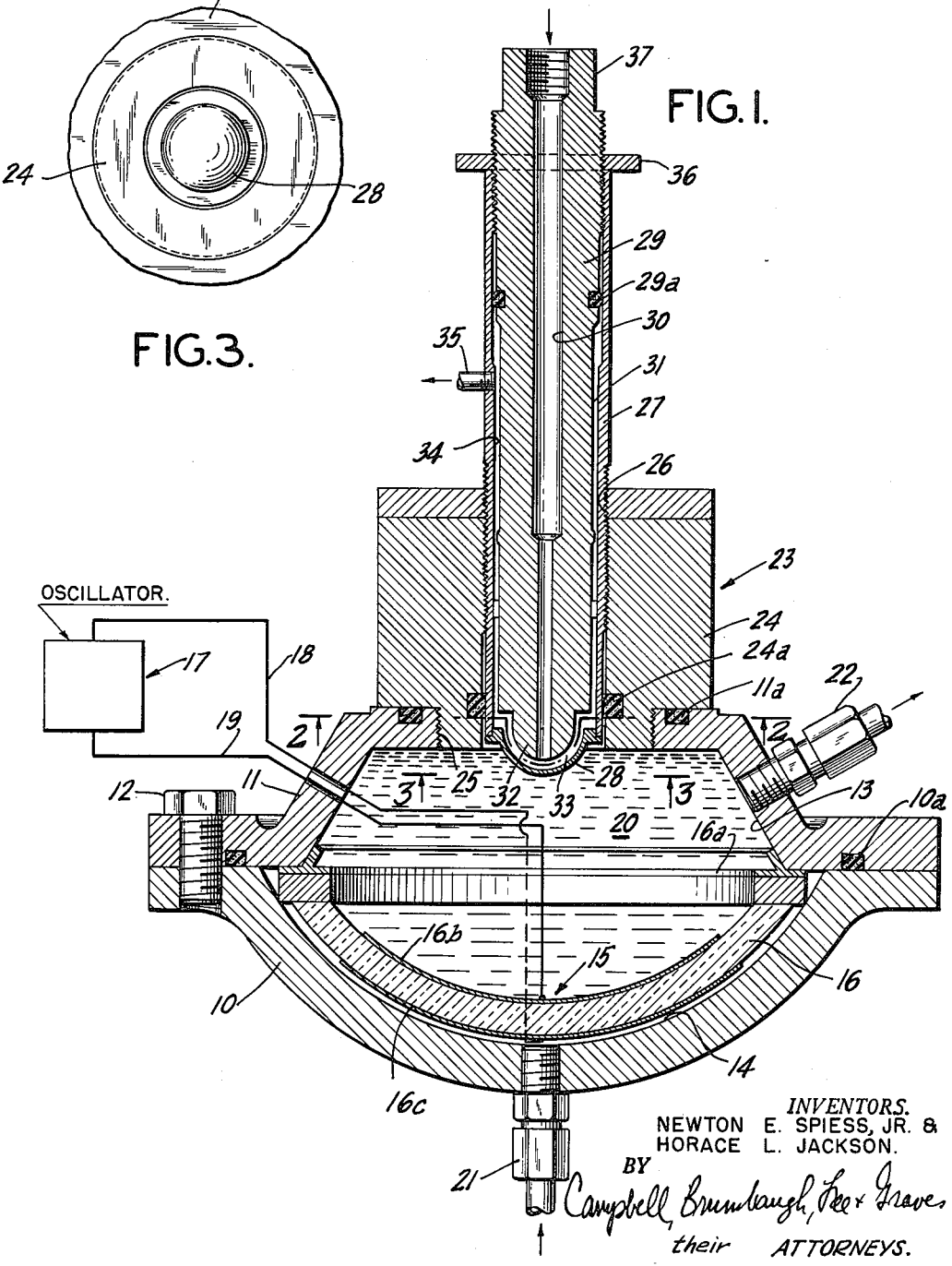

United States Patent Office 2,738,172
Patented Mar. 13, 1956

2,738,172

APPARATUS FOR TREATMENT OF PRODUCTS WITH ULTRASONIC ENERGY

Newton E. Spiess, Jr., Oakdale, and Horace L. Jackson, Babylon, N. Y., assignors to National Dairy Research Laboratories, Inc., Oakdale, Islip, N. Y., a corporation of Delaware Application November 28, 1952, Serial No. 322,874

8 Claims. (Cl. 259—1)

This invention relates to apparatus for treating products by means of ultrasonic energy and more particularly to apparatus utilizing high intensity ultrasonic energy to produce physical, chemical and other changes in products.

It has been found that ultrasonic energy properly applied will, for example, destroy bacterial organisms, reduce the particle size of fat in milk, and modify milk proteins in such a way as to reduce curd tension. While these and other phenomena have been observed in laboratory experiments, their application on a commercial scale has not been uniformly successful. Results have tended to be erratic despite attempts to maintain uniform operating conditions. Further, the efficiency of the treating equipment has often been too low to permit commercial use, even in cases where the results have been startlingly good. Attempts to improve the results by increasing the intensity of the ultrasonic energy have tended to further reduce the efficiency and in some cases have ended in complete failure due to the inability of the equipment itself to withstand the strains imparted by ultrasonic energy.

It is, therefore, one object of this invention to provide improved apparatus for treating products with high intensity ultrasonic energy.

It is another object of the invention to provide apparatus for treating products with high intensity ultrasonc energy in such a fashion as to attain consistent results in the treated product.

Another object of the invention is to improve the efficiency of ultrasonic treating apparatus so as to render its use practicable on a commercial scale.

These and other objects and features of the invention are attained by providing treating mechanism including an ultrasonic source or transducer, a chamber for accommodating a product to be treated and a controlled medium through which the mechanical energy may travel from the transducer to the product. The latter can include a non-resonant, sound transparent diaphragm defining a wall of the chamber. A reflector can be utilized to reflect ultrasonic waves which have passed through the product, back through the product.

To achieve the most effective results the respective distances between the transducer, the diaphragm and the reflector are closely adjusted so that the diaphragm and reflector will always be at respective locations of minimum cavitation and pressure variation and so that standing waves will be set up. To this end the reflector and diaphragm can both be disposed at integral number of half wave lengths from the transducer. The product to be treated, which is disposed between the diaphragm and the reflector, will then be in an area of maximum pressure variation resulting in maximum transfer of energy to the product but minimum expenditure of energy in the equipment.

In a preferred form of the invention the transducer may be used in conjunction with a focusing element for concentrating the ultrasonic energy in a relatively small area. Both the diaphragm and sound reflector will be curved in accordance with the focusing angle of the energy so that the prescribed distances from the source will be maintained at all points. In this fashion the energy for treating the product will be so concentrated as to facilitate rapid treatment without subjecting the diaphragm or other parts of the treating equipment to the disintegrating effects of the ultrasonic vibrations.

So that attenuation will be at minimum and so that cavitation will be eliminated, an ultrasonic transmitting medium such as oil may be maintained within the unit under a pressure which is equal to or greater than one-half the pressure variation in the ultrasonic waves generated therein. The high intensity of the energy in the vicinity of the treating chambers enables a continuous and rapid through-put of the product, and to accommodate this through-put a system has been designed in accordance with the invention to receive the product and to cause it to be spread out continuously over areas in which the energy transfer is at an absolute maximum.

The invention as well as other features thereof may be better understood by referring to the accompanying drawing, taken in conjunction with the following specification, in which:

Figure 1 is a vew in vertical section of treating apparatus formed in accordance with the present invention;

Figure 2 is a view in transverse section taken on the line 2—2 of Figure 1 looking in the direction of the arrows;

Figure 3 is a bottom view of a portion of the equipment of Figure 1 as viewed from the inside of the equipment and looking in the direction of the arrows 3—3;

Figure 4 is a diagram showing the condition which exists in a sound system when a sound wave is reflected back to the sound source, the diagram comprising a curve of the amplitude and/or velocity against wave length and/or distance; and Figure 5 is a diagram corresponding to that of Figure 4 but comprising a curve plotting pressure against wave length and/or distance.

Referring to Figures 1–3, the invention is illustrated as embodied in an assembly particularly adapted for the ultrasonic treatment of fluid products and comprises a pair of heavy housing parts 10 and 11 joined together in fluid tight relationship as by bolts 12, for example, to define a fluid tight cavity 13. Disposed within the cavity 13 in the vicinity of its lower spheroidal surface 14 is a sound source in the form of a transducer indicated generally by the numeral 15. The transducer 15 can include a crystal element 16, which may be substantially spheroidal in its curvature for purposes described below, mounted in an annulus 16a and embraced by a pair of electrodes 16b and 16c. The electrodes 16b and 16c can be connected to a suitable source of alternating electrical voltage such as the oscillator 17, for example, by means of electrical conductors 18 and 19 respectively. In accordance with well known principles, the application of an alternating voltage of selected frequency across the electrodes 16b and 16c will cause the crystal to vibrate, thereby to convert electrical energy to mechanical vibrations.

The fluid tight cavity 13 is filled with a suitable sound transmitting medium 20 such, for example, as oil, input and output fittings 21 and 22 being provided for this purpose. The oil medium, which may circulate through the chamber to control the temperature and hence prevent ultrasonic wave length variation, also serves to transmit the sound energy. In a preferred form of the invention the absolute static pressure on the oil should be maintained at a value which is at least one-half the presure variation in the sound waves passing through it, thereby to preclude harmful cavitation and to reduce attenuation.

Surmounting the housing part 11 is a product accommodating and treating chamber assembly indicated generally by the numeral 23 and comprising a cylindrical bushing 24 threaded into an aperture 25 formed in the upper wall of the housing part 11. The bushing 24 is formed with an internally threaded bore 26 into which threaded a sleeve 27 carrying near its depending end a sound-transparent diaphragm member 28 which is of generally spheroidal configuration for purposes described below, and the underside of which is disposed within the closed cavity 13. Threaded into the sleeve 27 is a tubular element 29 having a central bore 30, a necked-down portion 31 spaced at least in part radially inwardly from the inner wall of the sleeve 27, and a sound reflecting member in the form of a spheroidal tip portion 32 at its depending end. The reflecting member 32 can be of substantially the same configuration as the diaphragm member 28 and the crystal element 16.

The lower end of the axial bore 30 communicates with a shallow treating chamber 33, defined by the opposed surfaces of the reflecting member 32 and the diaphragm member 28, and comprises an inlet whereby a product to be treated may be introduced into the chamber 33. The necked-down portion 31 of the tubular element 29 and the inner wall of the sleeve 27 define a substantially toroidal conduit 34 by means of which the product finds its way out of the treating chamber 33, a suitable outlet fitting 35 being provided for this purpose. Gaskets or packings 10a, 11a, 24a and 29a can be provided as necessary to render the system fluid tight.

The product to be treated can be introduced into the bore 30 to flow downwardly into the chamber 33 where it will flow radially outwardly in all directions toward the toroidal conduit 34 from which it leaves the system. This flow direction is not critical and may be reversed. The sound energy developed by the transducer 15 will, in converging on the chamber 33, pass through the diaphragm member 28, through the product within the chamber 33, engage the reflecting member 32 and return to the transducer in the direction whence it came.

The behavior of the sound energy from the transducer 15 may be better understood by referring to Figures 4 and 5. In Figure 4 there is shown the condition which exists when a sound wave is reflected back to a sound source. As indicated by the curve, the amplitude and velocity variations are at a maximum at the transducer 15. One-fourth of a wave length from the transducer the amplitude and velocity variations are at zero, or a node, and pass through subsequent maxima and minima at one-fourth wave intervals thereafter. At the reflecting member 32, amplitude and velocity maxima obtain and the standing wave is thereby set up.

Referring to Figure 5 it will be seen that the pressure variation is at zero at the transducer 15 and passes through maxima and minima at one-fourth wave length intervals thereafter until it reaches the reflecting member 32 where the variation in pressure is again zero. Since cavitation in a fluid product or a fluid transmitting medium can only occur in areas of high pressure variation, there will be no cavitation at the half-wave length points B in the two diagrams. At the one-fourth and three-fourths wavelength points A, cavitation will be at a maximum.

In accordance with the invention the sound transparent diaphragm member 28 will be located at the point of zero pressure variation corresponding to the points B in the diagrams of Figures 4 and 5. The diaphragm member will thus be protected from destruction by the sound energy. To avoid excessive sound reflection the diaphragm should be limited in thickness to about 1/10 of a wave length. It may, of course, be thinner, consistent with the material used in its fabrication and its ability to withstand the stresses involved. The reflecting member 32 will likewise be disposed at a point of zero pressure variation and will be at least a half-wave length from the diaphragm member 28. Thus the product disposed in the chamber 33 will have disposed therein at least one point A of maximum pressure variation and minimum velocity and a condition of maximum transfer of energy to the product will obtain. In other words, by positioning the reflecting member 32 an integral number of half-wave lengths from the transducer and by positioning the diaphragm member 28 near a pressure node, destruction of the diaphragm will be prevented and the product within the chamber 33 will be subjected to maximum irradiation by sound energy.

As a practical matter the standing wave ratio within the system will not equal unity in accordance with the diagrams of Figures 4 and 5. The pressure variation will be more nearly in phase with the amplitude and velocity variation and the nodes will not be stationary but will move along at the speed of sound with the wave train. The point B, however, which corresponds to the location of the diaphragm member 28 will always be at a location of minimum cavitation.

In the arrangement of Figure 1 the crystal element 16 will generate sound energy over a large area and because it is curved with its concave surface facing the direction of sound propagation, it will act as its own focusing means to focus the sound energy toward a point behind the treating chamber 33. The reflecting member 32 is so curved that it reflects the focused sound energy back whence it came to tend to set up a standing wave which provides a stationary point of minimum pressure variation both at the reflecting member 32 and at the diaphragm member 28. The latter member is likewise curved so as to present a surface which is substantially normal to the direction of sound propagation at all points.

By means of this arrangement, minimum energy losses will occur in the transfer media comprising the oil in the cavity 13 and the diaphragm member 28. It will be understood further that the pressure, temperature and flow rate of the product being treated may be varied in the chamber 33 without having any noticeable effect on the transducer assembly 15.

It will be seen that the several distances between the sound source, the sound transmitting diaphragm and the sound reflector are readily adjustable. Thus by turning the sleeve 27 in the bushing 24, the diaphragm member 28 and reflecting member 32 may be moved as a unit toward and away from the transducer 15 thereby to approach a condition of standing sound waves within the system. To facilitate this adjustment a polygonal head 36 may be formed on the upper end of the sleeve 27.

By turning the tubular element 29 within the sleeve 27 the sound reflecting member 32 may be shifted relatively to the transducer 15 and the transmitting member 28. To facilitate this adjustment the tubular element may be formed with a polygonal head 37. If the sleeve 27 is turned while holding the tubular element, the transmitting member 28 and reflecting member 32 will move in opposite directions. Thus any desired adjustment may be attained.

It will be understood that a wide range of frequencies may be used in ultrasonic treating apparatus, with the size of the unit and its component parts being more or less a function of the frequencies used. With a transducer element 4 inches in diameter, for example, a frequency of about 400 kilocycles has been found to be practical.

A test which was run on ultrasonic equipment formed in accordance with this disclosure using carefully positioned reflector and sound transmitting diaphragm members in conjunction with focusing means for the ultrasonic source and maintaining the sound transmitting media under pressure produced, after 10 seconds of irradiation, homogenization of milk equivalent to that achieved using pressures of about 700 p. s. i. in a conventional homogenizer. Ultrasonic equipment utilizing a transducer in a non-pressurized transmitting medium and a treating chamber separated from the medium by a sound transparent diaphragm of random spacing from the transducer produced, after 2½ minutes of irradiation, homogenization of milk equivalent to that achieved using pressures of about 300 p. s. i. in a conventional homogenizer.

In experiments on bacterial destruction it has been found by earlier investigators that 2½ minutes of irradiation are required to obtain 50% destruction of *E. coli* in water at 80° F. when using maximum sound intensity in conventional equipment. Using equipment of the type described above, an equal degree of destruction can be obtained in 0.06 seconds, i. e., the rate of destruction has been increased 2,500 times. If the capacities of the two types of equipment are taken into account then it is found that the present design results in a sevenfold increase in volume of product that can be treated per unit of power input.

The particular form of the invention described and illustrated is presented as an example of how the invention may be applied and the phraseology and terminology employed is for purposes of description, not limitation. Other forms, embodiments and applications of the invention coming within the proper scope of the following claims will suggest themselves to those skilled in the art.

We claim:

1. In apparatus for the treatment of products by ultrasonic energy, a source of ultrasonic energy including means for focusing the energy toward a point, a treating chamber between the source and the point, an ultrasonic transmitting member separating the source from the chamber, said transmitting member being curved to receive focused ultrasonic energy in directions normal to its own surface, and an ultrasonic reflector on the far side of the treating chamber from the source and also disposed between the source and the focusing point, said reflector being shaped to receive the ultrasonic energy from the source and to reflect substantially all of said energy back through the treating chamber in directions whence it came.

2. In apparatus for the treatment of products by ultrasonic energy, a source of ultrasonic energy, a treating chamber for receiving a product to be treated disposed within the effective range of the source and separated therefrom by at least one ultrasonic transmitting medium, and an ultrasonic reflecting member on the far side of the treating chamber from the source spaced from the source by an integral number of half wave lengths of the ultrasonic waves generated by the source, said reflecting member being shaped to receive the ultrasonic energy substantially normal to its surface to reflect substantially all of the energy back through the treating chamber in directions whence it came, said reflecting member also being disposed inside the point of focus of the ultrasonic energy from the source.

3. In apparatus for the treatment of products by ultrasonic energy, a source of ultrasonic energy, a treating chamber for receiving a product to be treated disposed within the effective range of the source and separated therefrom by at least one ultrasonic transmitting medium, an ultrasonic transmitting member disposed between the source and the chamber and spaced from the source by an integral number of half wave lengths of the ultrasonic waves generated by the source, and an ultrasonic reflecting member on the far side of the treating chamber from the source spaced from the source by an integral number of half wave lengths of the waves generated by the source, said reflecting member being shaped to receive the ultrasonic energy substantially normal to its surface to reflect substantially all of the energy back through the treating chamber in directions whence it came, said reflecting member also being disposed inside the point of focus of the ultrasonic energy from the source.

4. In apparatus for the treatment of products by means of ultrasonic energy, a housing having a cavity for receiving fluid as an ultrasonic transmitting medium, a treating chamber for a product, a source for providing ultrasonic energy in the cavity, means including an ultrasonic reflecting member and an ultrasonic transmitting member disposed on opposite sides of the treating chamber, said transmitting member being adapted to be engaged by the transmitting medium and disposed between the source and the reflecting member, first adjusting means for establishing relative movement between the reflecting and transmitting members for varying the spacing therebetween, and second adjusting means for establishing relative movement between the source and both the reflecting and transmitting members to vary the spacing therebetween.

5. In apparatus for the treatment of products by means of ultrasonic energy, a housing having a cavity for receiving fluid as an ultrasonic transmitting medium, a treating chamber for a product, a source for providing ultrasonic energy in the cavity, an ultrasonic reflecting member and an ultrasonic transmitting member disposed on opposite sides of the treating chamber, said transmitting member being adapted to be engaged by the transmitting medium and disposed between the source and the reflecting member, first adjusting means for establishing relative movement between the reflecting and transmitting members for varying the spacing therebetween, and second adjusting means for establishing relative movement between the source and both the reflecting and transmitting members to vary the spacing therebetween and conduit means for passing a fluid product to be treated through said treating chamber.

6. In apparatus for the treatment of products by means of ultrasonic energy, a housing having a cavity for receiving fluid as a sound transmitting medium, a source for providing ultrasonic energy in the chamber, a treating chamber for a product, said chamber being bounded on opposite sides by an ultrasonic reflecting member and an ultrasonic transmitting member, the latter being adapted to be engaged by the transmitting medium, means for shifting said reflecting and transmitting members as a unit toward and away from said source, and means for shifting said reflecting member toward and away from said transmitting member.

7. In apparatus for the treatment of a product by means of ultrasonic energy, a housing having a cavity for receiving fluid as an ultrasonic transmitting medium, a source for providing ultrasonic energy in the cavity, a sleeve threaded into the housing to communicate with the cavity, an ultrasonic transmitting member carried by the inner end of the sleeve, a tubular member threaded into the sleeve and carrying an ultrasonic reflecting member adapted to be spaced from said transmitting member to define a treating chamber and to reflect sound back to the source, the tubular member having an axial bore for accommodating a product to be treated and communicating with said chamber, the tubular member also having outer wall means defining in conjunction with the inner wall of the sleeve a product accommodating conduit, whereby a flow of the product may be passed through the treating chamber and whereby the respective spacing between the source, the transmitting member and the reflecting member may be adjustably varied.

8. In apparatus for the treatment of a product by means of ultrasonic energy, a housing having a cavity for receiving a fluid under pressure as a sound conducting medium, an ultrasonic source mounted in the cavity, said source including a focusing means for focusing the ultrasonic energy toward a point, a sleeve threaded into the housing to communicate with the cavity, an ultrasonic transmitting member carried by the inner end of the sleeve and curved to receive energy from the source in directions substantially normal to its own surface, a tubular member threaded into the sleeve and carrying an ultrasonic reflecting member disposed between the source and the focusing point and curved to reflect focused energy om the source back to source in the directions whence came, said reflecting member being adapted to be placed from said transmitting member to define a treating chamber, the tubular member having an axial bore accommodating a product to be treated and communicating with said chamber, the tubular member also having outer wall means defining, in conjunction with the inner wall of the sleeve a product accommodating conduit, whereby a flow of the product may be passed through the treating chamber and whereby the respective spacing between the source, the transmitting member and the reflecting member may be adjustably varied.

References Cited in the file of this patent

UNITED STATES PATENTS

| | | |
|---|---|---|
| 2,163,649 | Weaver | June 27, 1939 |
| 2,447,061 | Franklin | Aug. 17, 1948 |
| 2,552,970 | Horsley et al. | May 15, 1951 |
| 2,565,159 | Williams | Aug. 21, 1951 |
| 2,578,505 | Carlin | Dec. 11, 1951 |
| 2,632,634 | Williams | Mar. 24, 1953 |

FOREIGN PATENTS

| | | |
|---|---|---|
| 654,673 | Germany | Dec. 24, 1937 |